United States Patent
Yeon et al.

(10) Patent No.: US 9,900,833 B2
(45) Date of Patent: Feb. 20, 2018

(54) MOBILE TERMINAL AND METHOD OF OPERATING THE SAME

(71) Applicant: Samsung Electronics Co., Ltd., Suwon-si, Gyeonggi-do (KR)

(72) Inventors: Hun-je Yeon, Seoul (KR); Woo-jin Park, Yongin-si (KR); Jae-sick Shin, Siheung-si (KR); Min-suk Choi, Suwon-si (KR); Moon-ki Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 14/533,681

(22) Filed: Nov. 5, 2014

(65) Prior Publication Data

US 2015/0189579 A1 Jul. 2, 2015

(30) Foreign Application Priority Data

Dec. 30, 2013 (KR) ........................ 10-2013-0167496

(51) Int. Cl.
*H04W 48/18* (2009.01)
*H04W 4/00* (2018.01)
*H04W 48/16* (2009.01)
*H04W 84/12* (2009.01)

(52) U.S. Cl.
CPC .......... *H04W 48/18* (2013.01); *H04W 4/001* (2013.01); *H04W 4/008* (2013.01); *H04W 48/16* (2013.01); *H04W 84/12* (2013.01)

(58) Field of Classification Search
CPC .............................. H04W 48/18; H04W 48/16
See application file for complete search history.

(56) References Cited

U.S. PATENT DOCUMENTS

| | | | |
|---|---|---|---|
| 2002/0035613 A1* | 3/2002 | Hirayama | ......... G06F 17/30905 709/218 |
| 2002/0160817 A1 | 10/2002 | Salmimaa et al. | |
| 2006/0039337 A1* | 2/2006 | Hodoshima | ......... H04L 63/0823 370/338 |
| 2006/0271934 A1* | 11/2006 | Ezaki | ...................... G06F 9/468 718/100 |
| 2011/0269400 A1 | 11/2011 | Kweon et al. | |
| 2012/0099476 A1* | 4/2012 | Mahaffy | ................. H04L 67/16 370/254 |
| 2012/0317194 A1 | 12/2012 | Tian | |
| 2013/0067065 A1 | 3/2013 | Navasivasakthivelsamy et al. | |
| 2013/0250803 A1* | 9/2013 | Abraham | ................ H04L 67/16 370/254 |

FOREIGN PATENT DOCUMENTS

| | | |
|---|---|---|
| EP | 2 605 607 A1 | 6/2013 |
| KR | 10-2009-0076104 A | 7/2009 |
| WO | 2013-032264 A1 | 3/2013 |

\* cited by examiner

*Primary Examiner* — Jamal Javaid

(74) *Attorney, Agent, or Firm* — Jefferson IP Law, LLP

(57) ABSTRACT

A mobile terminal and a method operating the same are provided. The method includes generating a list of a service that may be provided to an external via a Local Area Network (LAN), transmitting the generated service list to the external terminal, receiving a request for providing a service that is included in the service list from the external terminal, and connecting the mobile terminal to the external terminal via the LAN and providing the requested service to the external terminal.

20 Claims, 8 Drawing Sheets

MOBILE TERMINAL AND METHOD OF OPERATING THE SAME

CROSS-REFERENCE TO RELATED APPLICATION(S)

This application claims the benefit under 35 U.S.C. § 119(a) of a Korean patent application filed on Dec. 30, 2013, in the Korean Intellectual Property Office and assigned Serial number 10-2013-0167496, the entire disclosure of which is hereby incorporated by reference.

TECHNICAL FIELD

The present disclosure relates to a mobile terminal and a method of operating the same. More particularly, the present disclosure relates to a mobile terminal for transmitting a list of a service that may be provided by the mobile terminal to an external terminal, receiving a request for providing a service from the external terminal, being connected to a Local Area Network (LAN), and providing a service, and a method of operating the same.

BACKGROUND

A mobile terminal is a mobile device that may be carried and includes one or more functions of performing a voice or video phone call, inputting or outputting information, and storing data. As functions of a mobile terminal have been diversified, a mobile terminal may include functions of capturing a still image or a moving image, playing a music file or a video clip, providing a game, receiving a broadcast, or providing a wireless internet. A mobile terminal may be implemented as a comprehensive multimedia player.

Additionally, a mobile terminal may provide various services to external terminals via a Local Area Network (LAN) or receive various services from external devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mobile terminal for transmitting a service list to an external terminal or receiving a service list from an external terminal before being connected to the external terminal via a Local Area Network (LAN), and a method of operating the same.

Additional aspects will be set forth in part in the description which follows and, in part, will be apparent from the description, or may be learned by practice of the presented various embodiments.

In accordance with an aspect of the present disclosure, a method of operating a mobile terminal is provided. The method includes generating a list of at least one service that may be provided to an external terminal via a LAN, transmitting the generated service list to the external terminal, receiving a request for providing a service that is included in the service list from the external terminal, and connecting the mobile terminal to the external terminal via the LAN and providing the requested service to the external terminal.

In accordance with another aspect of the present disclosure, a method of operating a mobile terminal is provided. The method includes receiving a list of at least one service that may be provided by an external terminal via a LAN from the external terminal, displaying the received service list, requesting to provide a service included in the service list, and connecting the mobile terminal to the external terminal that corresponds to the requested service via the LAN and receiving the requested service.

In accordance with another aspect of the present disclosure, a mobile terminal is provided. The mobile terminal includes a service list control unit configured to generate a list of a service that may be provided to an external terminal via a LAN, and a wireless communication configured to transmit the generated service list to the external terminal, to receive a request to provide a service that is included in the service list from the external terminal, and to connect the mobile terminal to the external terminal and provide the requested service to the external terminal via the LAN.

In accordance with another aspect of the present disclosure, a mobile terminal is provided. The mobile terminal includes a wireless communication unit configured to receive a list of a service that may be provided by an external terminal via a LAN, and a display unit configured to display the received service list, wherein the wireless communication unit transmits a signal for requesting to provide a service included in the service list and connects the mobile terminal to an external terminal that corresponds to the requested service via the LAN.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that terms 'unit' or 'module' are used herein for ease of description, and do not have a particularly significant meaning or role. Accordingly, the terms 'unit' or 'module' may be interchangeably used.

Figure 1:
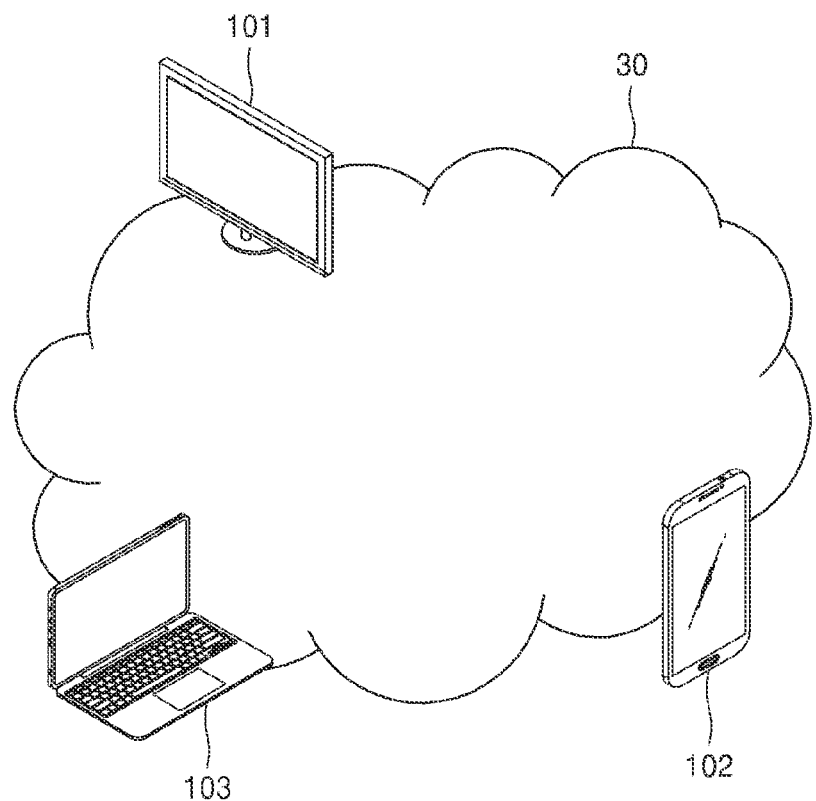
FIG. 1 is a diagram illustrating a service-providing system between mobile terminals on a Local Area Network (LAN) according to an embodiment of the present disclosure.

FIG. 1 is a diagram illustrating a service-providing system between mobile terminals on a Local Area Network (LAN) 30 according to an embodiment of the present disclosure.

Referring to FIG. 1, according to an embodiment of the present disclosure, the service-providing system may include a plurality of mobile terminals 101 through 103 that are present on the LAN 30. The LAN 30 may include BLUETOOTH (BT), BLUETOOTH Low Energy (BLE), or WiFi.

The plurality of mobile terminals 101 through 103 may include a first mobile terminal 101, a second mobile terminal 102, and a third mobile terminal 103. In the description of various embodiments of the present disclosure, the mobile terminals 101 through 103 may include a TV, a monitor, a cellular phone, a smartphone, a notebook computer, a tablet Personal Computer (PC), a digital broadcasting terminal, a Personal Digital Assistant (PDA), a Portable Multimedia Player (PMP), or the like. However, the mobile terminal 101 through 103 are not limited thereto, and may include various other wireless communication devices that may be connected to the LAN and operate.

Additionally, the plurality of mobile terminals 101 through 103 may be terminals that operate on a same LAN, and may provide various services to other mobile terminals (i.e., external terminals).

When the first mobile terminal 101 operates an interface of the LAN 30, for example, when the first mobile terminal 101 turns WiFi or BT on, the interface of the LAN 30 may receive a packet broadcast by the first mobile terminal 101, and the first mobile terminal 101 may transmit a packet broadcast to the interface of the LAN 30.

Accordingly, the first mobile terminal 101 analyzes a service that may be provided by the first mobile terminal 101, generates a service list, and broadcasts a packet that includes information about the service list to the interface of the LAN 30. The first mobile terminal 101 may periodically broadcast a packet.

Accordingly, the first mobile terminal 101 may transmit the packet that includes the information about the service list to an external terminal such as the second mobile terminal 102 or the third mobile terminal 103 that have operated the interface of the LAN 30.

For example, if an external terminal (e.g., the second mobile terminal 102 or the third mobile terminal 103) operates an interface of the LAN 30 which is identical to the interface of the LAN 30 operated by the first mobile terminal 101, the external terminal (i.e., the second mobile terminal 102 or the third mobile terminal 103) may receive the packet broadcast to the interface of the LAN 30 by the first mobile terminal 101.

The first mobile terminal 101 may receive the packet, broadcast by the external terminal (i.e., the second mobile terminal 102 or the third mobile terminal 103) that has operated the interface of the LAN 30. Accordingly, the first mobile terminal 101 may receive the packet that includes information about the service list, and analyze data of the received packet, and display the service list.

If the first mobile terminal 101 requests the external terminal (i.e., the second mobile terminal 102 or the third mobile terminal 103) to provide a service included in the displayed service list, the first mobile terminal 101 may connect to the external terminal (i.e., the second mobile terminal 102 or the third mobile terminal 103) via the LAN 30, and receive the requested service.

Accordingly, the plurality of the mobile terminals 101 through 103 that operate the same interface of the LAN 30 may receive a packet that includes information about the service list, broadcast to the interface of the LAN 30, and check the service list provided from another mobile terminal, without having to being connected to the LAN 30.

Figure 2:
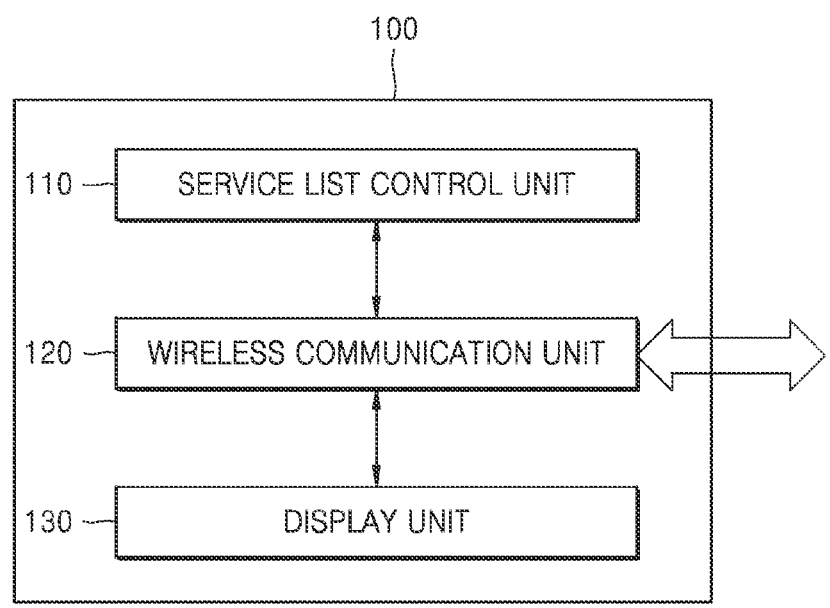
FIG. 2 is a block diagram of a configuration of a mobile terminal according to an embodiment of the present disclosure.

FIG. 2 is a block diagram of a configuration of a mobile terminal 100 according to an embodiment of the present disclosure.

Referring to FIG. 2, according an embodiment of the present disclosure, the mobile terminal 100 may include a service list control unit 110, a wireless communication unit 120, and a display unit 130.

The service list control unit 110 may analyze a service that may be provided to an external terminal by the mobile terminal 100, and generate a service list. For example, the service list control unit 110 may generate a packet that includes at least one piece of unit data in correspondence with the service that may be provided to the external terminal.

The unit data may include an identifier for a service and data regarding details of the service. The unit data may be included in a particular part of the packet according to a LAN. This will be described in more detail below, with reference to FIGS. 4A and 4B.

Figure 4A:
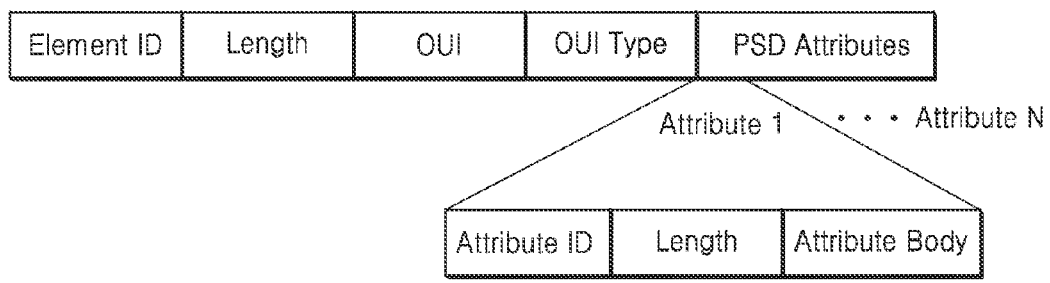
FIGS. 4A and 4B are diagrams illustrating a packet that includes information about a service list according to an embodiment of the present disclosure.
Figure 4B:
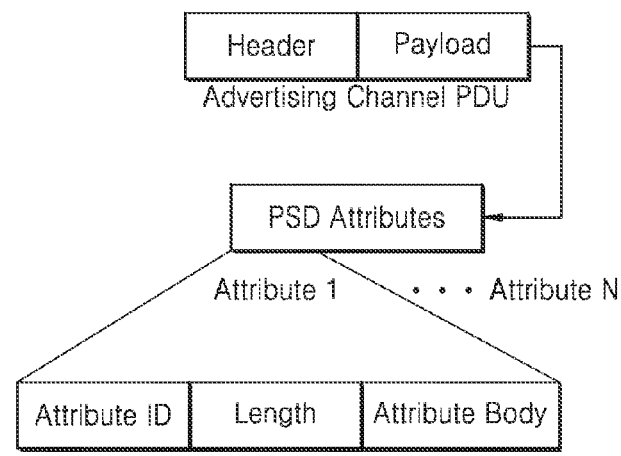

FIG. 4A shows a packet that is configured when a LAN is a wireless LAN according to an embodiment of the present disclosure. FIG. 4B shows a packet that is configured when a LAN is BT or BLE according to an embodiment of the present disclosure.

Referring to FIG. 4A, if a LAN is a wireless LAN, unit data may be included in a management frame such as a beacon frame or a probe request/response frame, in accordance with an Institute for Electrical and Electronics Engineers (IEEE) 802.11 standard which is a wireless LAN standard.

A beacon frame is a broadcasting frame in which an Access Point (AP) periodically notifies of presence of a wireless network that is covered by the AP. Additionally, a probe request frame is a frame that is transmitted to probe which AP is present near a mobile terminal, and a probe response frame is a frame that is transmitted as a response to the probe request frame.

According to an embodiment of the present disclosure, unit data may be included in an Information Element (IE) of the beacon frame or the probe request/response frame.

Referring to FIG. 4A, fields that constitute IEs are fields that are defined according to a standard. The fields may include an Element Identification (ID), a length, an Organizationally Unique Identifier (OUI), an OUI type, and a Pre-connection Service Discovery (PSD) attributes fields. The PSD attributes field is a field that includes data regarding a service list, and may include a plurality of pieces of unit data. The element ID, length, OUI, and OUI type fields are fields that are defined according to a standard, and a description thereof will not be provided here.

An attribute which is one piece of unit data may represent one service, and includes an attribute ID, a length, and an attribute body field. The attribute ID represents an ID of a service, the length represents a length of an attribute body, and the attribute body represents details of the service.

Referring to FIG. 4B, if a LAN is BT or BLE, unit data may be included in a payload part of an advertising channel Protocol Data Unit (PDU) from among BT or BLE protocols.

A description about unit data is identical to a description in such a case that the LAN is a wireless LAN, described with reference to FIG. 4A. Thus, a description thereof will not be provided here again.

Referring back to FIG. 2, the service list control unit 110 may analyze a received packet and configure a service list. For example, the service list control unit 110 may analyze unit data included in a packet that is received from external terminals, and configure a service list.

The wireless communication unit 120 may include a wireless internet module and a short-range communication module, and may further include a network interface unit.

The wireless internet module refers to a module for a wireless internet connection, and may be built in or outside the mobile terminal 100. Wireless LAN (e.g., WiFi), a Wireless broadband (Wibro), World Interoperability for microwave access (Wimax), and a High-Speed Downlink Packet Access (HSDPA) may be employed as a wireless internet technology.

A short-range communication module refers to a module for a short-range communication. BT, Radio Frequency Identification (RFID), Infrared Data Association (IrDA), Ultra WideBand (UWB), or ZIGBEE may be employed as a short-range communication technology.

The network interface unit may provide an interface for connecting the mobile terminal 100 to a wire/wireless network that includes an internet network. For example, the mobile terminal 100 may operate a LAN interface via the network interface unit.

According to an embodiment of the present disclosure, the wireless communication unit 120 may broadcast a packet that includes a service list, generated by the service list control unit 110, to a LAN interface, and transmit the packet to other external terminals. The wireless communication unit 120 may periodically broadcast a packet that includes information about a service list to a LAN interface. Additionally, the wireless communication unit 120 may receive a packet that is broadcast to the LAN interface from other external terminals.

The display unit 130 converts an image signal, a data signal, an On-Screen-Display (OSD) signal, or a control signal, which are processed by the mobile terminal 100, to generate a driving signal. The display unit 130 may be implemented as a Plasma Display Panel (PDP), a Liquid-Crystal Display (LCD), an Organic Light-Emitting Diode (OLED), a flexible display, or a three-Dimensional (3D) display. Additionally, the display unit 130 may be formed of a touch screen, and used as an input apparatus as well as an output apparatus.

According to an embodiment of the present disclosure, the display unit 130 may display a service list that is configured based on a packet received from an external terminal. The service list may include an ID and a service name of the external terminal that provides a service, and may also include a name of a LAN connected to the external terminal. Additionally, according to an embodiment of the present disclosure, the display unit 130 may display a relative position of an external terminal that provides a service.

Figure 3:
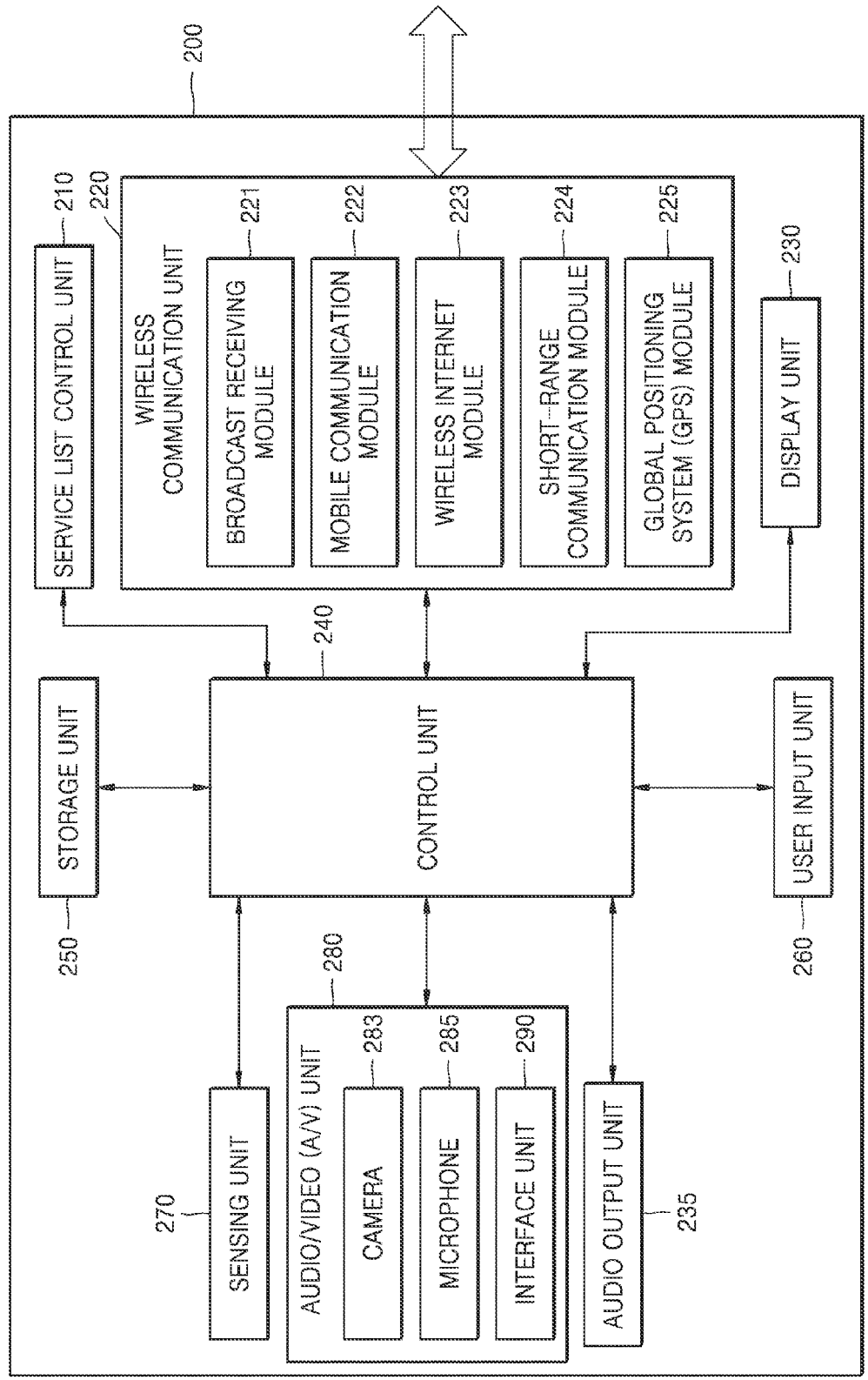
FIG. 3 is a block diagram of a configuration of a mobile terminal according to another embodiment of the present disclosure.

FIG. 3 is a block diagram of a configuration of a mobile terminal 200 according to another embodiment of the present disclosure.

Referring to FIG. 3, according another embodiment of the present disclosure, the mobile terminal 200 may include a service list control unit 210, a wireless communication unit 220, a display unit 230, a controller 240, a storage unit 250, a user input unit 260, a sensing unit 270, and an Audio/Video (A/V) unit 280. When such components are actually implemented in an application, two or more of the components may be combined into one component, or one of the components may divided into and form two or more components.

The wireless communication unit 120, the display unit 130, and the service list control unit 110 respectively correspond to the wireless communication unit 220, the display unit 230, and the service list control unit 210. Thus, a description thereof will not be provided here again.

The wireless communication unit 220 may include a broadcast receiving module 221, a mobile communication module 222, a wireless internet module 223, a short-range communication module 224, and a Global Positioning System (GPS) module 225.

The broadcast receiving module 221 receives at least one of a broadcasting signal and broadcasting-related information from an external broadcasting management server via a broadcasting channel. A broadcasting management server may refer to a server that generates and transmits at least one of a broadcasting signal and broadcasting-related information, or a server that receives and then transmits at least one of the generated broadcasting signal and broadcasting-related information to a terminal.

A broadcasting signal may include a television (TV) broadcasting signal, a radio broadcasting signal, or a data broadcasting signal, and may also include a broadcasting signal in the form in which a data broadcasting signal is combined with a TV broadcasting signal or a radio broadcasting signal. Broadcasting-related information may refer to information about a broadcasting channel, a broadcasting program, or a broadcasting service provider. Broadcasting-related information may also be provided via a mobile communication network. In this case, broadcasting-related information may be received by the mobile communication module 222. Broadcasting-related information may also be present in various forms. For example, broadcasting-related information may be present in the form of an Electronic Program Guide (EPG) of Digital Multimedia Broadcasting (DMB) or an Electronic Service Guide (ESG) of Digital Video Broadcast-Handheld (DVB-H).

The broadcast receiving module 221 may receive a broadcasting signal by using various broadcasting systems. Particularly, the broadcast receiving module 221 may receive a broadcasting signal by using a digital broadcasting system such as DMB-Terrestrial (DMB-T), a DMB-Satellite (DMB-S), Media Forward Link Only (MediaFLO), DVB-H, or Integrated Services Digital Broadcast-Terrestrial (ISDB-T). The broadcast receiving module 221 may be formed to be appropriate for all broadcasting systems that provide a broadcasting signal, as well as such a digital broadcasting system. A broadcasting signal and/or broadcasting-related information, received from the broadcast receiving module 221, may be stored in the storage unit 250.

The mobile communication module 222 may transmit and receive a wireless signal with at least one from among a base station, an external terminal, and a server on a mobile communication network. The wireless signals may include a voice call signal, a video phone call signal, or various forms of data used to transmit and receive text or multimedia messages.

The wireless internet module 223 refers to a module for a wireless internet connection, and may be built in or outside the mobile terminal 200. Wi-Fi, Wibro, Wimax, HSDPA may be employed as a wireless internet technology.

The short-range communication module 224 refers to a module for a short-range communication. BT, RFID, IrDA, UWB, or ZIGBEE may be employed as a short-range communication technology.

The GPS module 225 receives location information from a plurality of GPS satellites.

The A/V input unit 280 functions to receive an input of an audio signal or a video signal. The A/V input unit 280 may include a camera 283 and a microphone 285. The camera 283 processes an image frame such as a still image or a moving image that is obtained through an image sensor in a video phone mode or a photographing mode. The processed image frame may be displayed on the display unit 250.

The image frame processed by the camera 283 may be stored in the storage unit 250 or transmitted to the outside through the wireless communication unit 220. Two or more cameras 283 may be included according to a configuration type of a terminal.

The microphone 285 receives an external sound signal through a microphone in a phone call mode, a recording mode, or a voice recognition mode, and processes the external sound signal into electrical voice data. If in a phone call mode, the processed voice data may be converted into a form in which the voice data may be transmitted to a mobile communication base station via the mobile communication module 222 and output. The microphone 285 may employ various noise removal algorithms for removing noise that may be generated in a process of receiving an external sound signal.

The user input unit 260 generates key input data that is input by a user to control an operation of a terminal. The user input unit 260 may be formed of a key pad that may receive an input of a command or information according to a push or touch operation by a user, a dome switch, a touch pad, which may be a capacitive overlay type or a resistive overlay type. The user input unit 260 may also be formed of a jog wheel or a jog type for rotating a key, a manipulation type such as a jog stick, or a finger mouse. Particularly, if a touch pad and the display unit 230, which will be described later, form a layered structure, this may be referred to as a touch screen.

The sensing unit 270 senses a current status of the mobile terminal 200, such as an open/close status or a location of the mobile terminal 200, and then, generates a sensing signal for controlling an operation of the mobile terminal 200. For example, if the mobile terminal 200 is in the form of a sliding phone, the sensing unit 270 may sense whether the sliding phone is opened or closed. Additionally, the sensing unit 270 may sense whether a power supply unit supplies power or whether an interface unit 290 is connected to an external device.

The sensing unit 270 may include a detection sensor, a pressure sensor, or a motion sensor. A detection sensor may detect an object that approaches the mobile terminal 200 or the presence of an object that is present near the mobile terminal 200 without a physical contact. A detection sensor may detect a nearby object by using a change in a magnetic alternating field or a change in a magnetostatic field, or by using a rate of a change in an electrostatic capacity.

A pressure sensor may detect whether a pressure is exerted on the mobile terminal 200 and a size of the pressure. A pressure sensor may be installed in an area where detection of a pressure is necessary in the mobile terminal 200 according to a use environment. If a pressure sensor is installed in the display unit 230, the pressure sensor may identify a touch input and a pressure-touch input by which a greater pressure than the touch input is exerted via the display unit 230, according to a signal output from the pressure sensor. Additionally, a pressure sensor may detect a size of a pressure exerted on the display unit 230 when a pressure touch is input to the display unit 230, according to a signal output from the pressure sensor.

A motion sensor detects a location or a motion of the mobile terminal 200 by using an acceleration sensor or a gyro sensor. An acceleration sensor that may be used as a motion sensor is a device that converts a change in acceleration into an electrical signal. As Micro-ElectroMechanical Systems (MEMS) technology has advanced, an acceleration sensor is widely used. Additionally, a gyro sensor is a sensor for measuring an angular velocity, and may detect a turning direction in correspondence with a reference direction.

An audio output unit 235 functions to output an audio signal.

The audio output unit 235 may include (not shown) an audio output module and an alarm unit. The audio output module outputs audio data that is received from the wireless communication unit 220 in a call signal receiving mode, a phone call mode, a recording mode, a voice recognition mode, or a broadcast receiving mode or stored in the storage unit 250. The audio output module outputs a sound signal related to a function performed by the mobile terminal 200, for example, a call signal reception sound or a message reception sound. The audio output module may include a speaker, a buzzer, or the like.

The alarm unit outputs a signal for notifying of event occurrence of the mobile terminal 200. An example of an event that occurs in the mobile terminal 200 may include call signal reception, message reception, or key signal input. The alarm unit outputs a signal for notifying of event occurrence in a different form from an audio signal or a video signal. If receiving a call signal or a message, the alarm unit may output a signal for notifying of the receiving of the call signal or the message. If receiving an input of a key signal, the alarm unit may output a signal as feedback on the input of the key signal. A user may recognize event occurrence through a signal output from the alarm unit. A signal for notifying of event occurrence, which occurs in the mobile terminal 200, may be output via the display unit 230 or the audio output module.

The display unit 230 displays and outputs information processed by the mobile terminal 200. For example, if the mobile terminal 200 is in a phone call mode, the display unit 141 displays a User Interface (UI) or a Graphic User Interface (GUI) related to the phone call. If the mobile terminal 200 is in a video phone mode or a photographing mode, the display unit 230 displays a captured or received image respectively or at the same time, and display a UI or a GUI.

As described above, if the display unit 230 and a touch pad form a layered structure to constitute a touch screen, the display unit 230 may be also used as an input apparatus that may receive an input of information by a user touch, as well as an output apparatus.

If the display unit 230 is formed of a touch screen, the display unit 230 may include a touch screen panel, a touch screen panel controller, and the like. In this case, the touch screen panel is a transparent panel attached to the outside, and may be connected to an internal bus of the mobile terminal 200. The touch screen panel waits for a result of a touch and, if a touch input is present, transmits corresponding signals to the touch screen panel controller. The touch screen panel controller processes the signals and then transmits corresponding data to the controller unit 240, so that the controller 240 may become aware of whether a touch input has been present and which part of a touch screen is touched.

The storage unit 250 may function to store a program for processing and controlling the control unit 250, or to temporarily store input or output data, for example, a phonebook, a message, a still image, or a moving image.

The storage unit 250 may include at least one storage medium from among a flash memory, a hard disk, a multimedia card micro, a card-type memory such as a Secure Digital (SD) or eXtreme Digital (XD) memory, a Random Access Memory (RAM), and a Read-Only Memory (ROM). Additionally, the mobile terminal 100 may operate a web storage for performing a storage function of the storage unit 250 on the internet.

The interface unit 290 functions as an interface with all external devices connected to the mobile terminal 200. An example of an interface of the interface unit 290, connected to the mobile terminal 200, may include a wired/wireless headset terminal, an external charger terminal, a wired/wireless data port, a card socket for a memory card, a Subscriber Identification Module (SIM) card, a User Identity Module (UIM) card, an audio Input/Output (I/O) terminal, a video I/O terminal, or an earphone terminal. The interface unit 290 may receive data or power from an external device, and may transmit the data or the power to each component of the mobile terminal 200. The interface unit 290 may also transmit data inside the mobile terminal 200 to an external device.

The interface unit 290 may function as a path via which, when the mobile terminal 200 is connected to an external cradle, a power from the connected cradle is supplied to the mobile terminal 200 or various command signals input from the external cradle by a user are transmitted to the mobile terminal 200.

The controller 240 generally controls all operations of the mobile terminal 200 by controlling each component of the mobile terminal 200. For example, the controller 240 performs controls and processing relevant to a voice phone call, data communication, or a video phone call. Additionally, the controller 240 may include a multimedia playback module for playing multimedia. The multimedia playback module may be configured as hardware in the controller 240, or alternately, configured as software separately from the controller 240.

The mobile terminal having such a configuration may include a wired/wireless communication system and a satellite-based communication system, and thus, be configured to operate in a communication system in which data may be transmitted via a frame or a packet.

FIGS. 2 and 3 respectively show block diagrams of the mobile terminals 100 and 200, according to an embodiment of the present disclosure. Each component of the block diagrams may be combined, added, or omitted according to actual specifications of the mobile terminals 100 and 200. In other words, two or more of the components may be combined into one component, or one of the components may divided into and thus form two or more components. Additionally, functions performed with respect to each block diagram are provided to describe various embodiments of the present disclosure, and a particular operation or apparatus does not limit the scope of various embodiments of the present disclosure.

Figure 5:
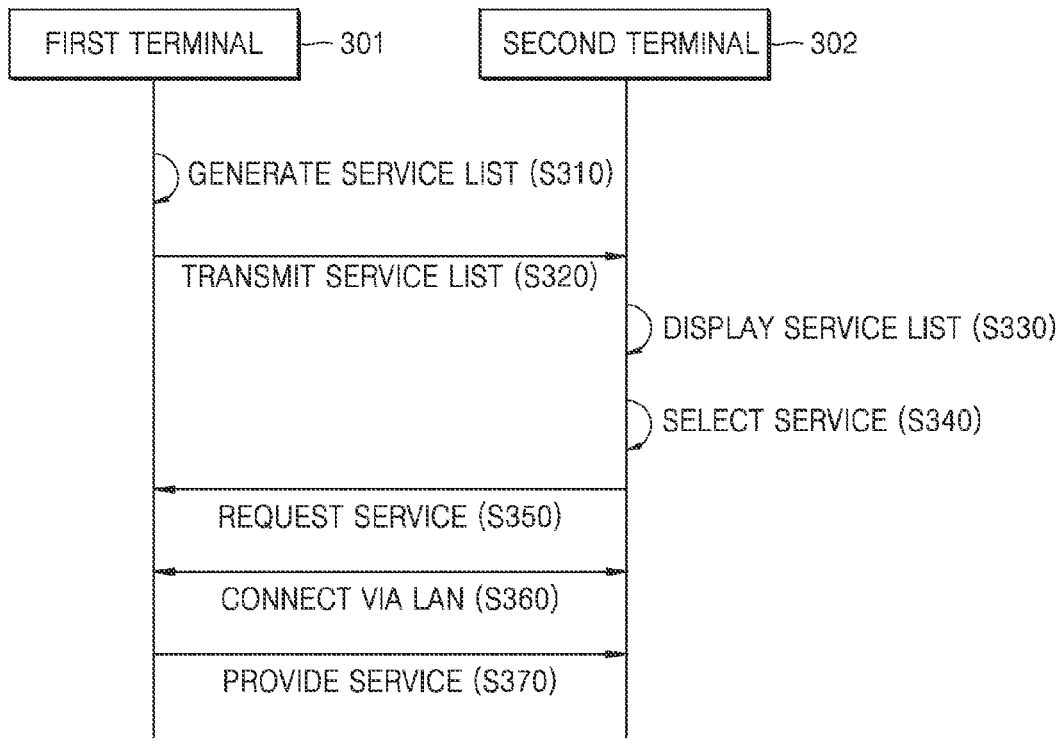
FIG. 5 is a diagram illustrating a method of providing a service between mobile terminals on a LAN according to an embodiment of the present disclosure.
Figure 6:
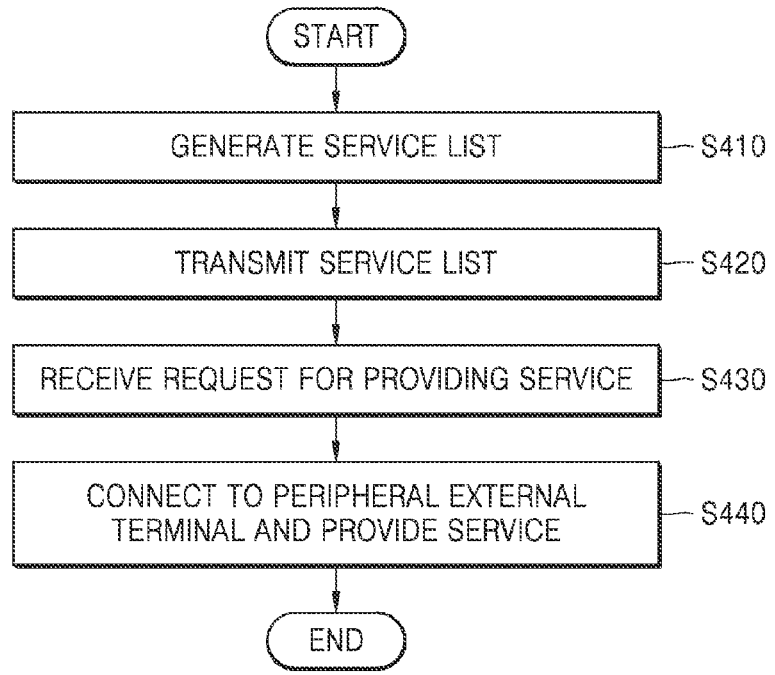
FIG. 6 is a flowchart of a method of operating a mobile terminal according to an embodiment of the present disclosure.
Figure 7:
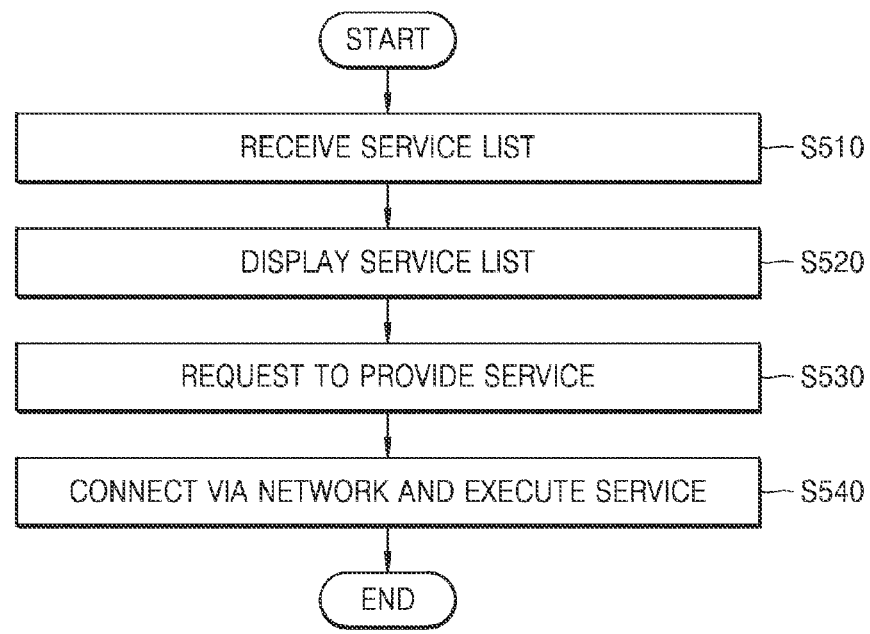
FIG. 7 is a flowchart of a method of operating a mobile terminal according to another embodiment of the present disclosure.

FIG. 5 is a diagram illustrating a method of providing a service between mobile terminals on the LAN according to an embodiment of the present disclosure. FIGS. 6 and 7 are flowcharts of a method of operating the mobile terminal according to various embodiments of the present disclosure.

Referring to FIG. 5, in operation S310, a first terminal 301 analyzes a service that may be provided to an external terminal, for example, a second terminal 302, and generates a service list.

For example, a service that may be provided to an external terminal may include all services that may be provided to an external terminal connected to the first terminal 301 via a wireless network, such as a sharing service, a synchronization service, a printer service, a network storage service, a messenger service, or the like. A sharing service is a service in which various contents are shared with an external terminal, and a synchronization service is a service in which a video clip or audio data, which are played by an external terminal, are synchronized and played by a first terminal. A printer service is a service in which a document is received from an external terminal, and the received document is output. Only when a document executed by an external terminal may be output, a printer service may be included in a service list. A network storage service is a service in which data from an external terminal (the second terminal) may be stored in the first terminal 301. A messenger service is a service in which a message may be transmitted and received between an external terminal and the terminal by executing a messenger program therebetween. However, services that may be provided to an external terminal are not limited thereto.

The first terminal 301 may generate a packet that includes at least one piece of unit data in correspondence with a service that may be provided. A configuration of unit data and a packet was described above, and thus, a description thereof will not be provided again.

Operation S310, shown in FIG. 5, corresponds to operation S410 shown in FIG. 6.

In operation S320, the first terminal 101 may transmit a packet that includes information about the generated service list to the second terminal 302. As described with respect to FIG. 4A, the packet may be configured as a management Pframe such as a beacon frame or a probe request/response frame, in accordance with an IEEE 802.11 standard. Alternately, as described with reference to FIG. 4B, the packet may be configured as an advertising channel PDU of BT or BLE.

The first terminal 301 may periodically broadcast the packet to a LAN interface, and the second terminal 302 that has operated the same LAN interface may receive the packet.

Operation S320, shown in FIG. 5, corresponds to operation S420 shown in FIG. 6 and operation S510 shown in FIG. 7.

In operation S330, the second terminal 302 may receive the packet that includes the information about the service list, and display a service list that corresponds to the received packet. The second terminal 302 may analyze unit data included in the received packet and configure a service list based on a service identifier and details of a service included in the unit data.

For example, if the received packet is a beacon frame or a probe request/response frame in accordance with the IEEE 802.11 standard, the second terminal 302 may analyze unit data included in IE of the beacon frame or the probe request/response frame and configure a service list.

If the received packet is a BT or BLE protocol, the second terminal 302 may analyze unit data included in a payload part of the protocol, and configure a service list.

The configured service list may be displayed on the second terminal 302. The service list may, for example, include an ID and a service name of the external terminal that provides a service. The service list may display a relative position of the external terminal that provides a service, together with the service list.

Operation S330, shown in FIG. 5, corresponds to operation S520 shown in FIG. 7.

In operation S340, when the service list is displayed on the second terminal 302, a user may select at least one of services that are displayed in the service list.

In operation S350, the second terminal 302 may transmit a service request signal to an external terminal that corresponds to the selected service, for example, the first terminal 301. In correspondence with this, the first terminal 301 may receive a service request signal from the second terminal 302.

Operation S350, shown in FIG. 5, corresponds to operation S430 shown in FIG. 6 and operation S530 shown in FIG. 7.

When the first terminal 301 receives the service request signal from the second terminal 302, the first terminal 301 and the second terminal 302 are connected to each other via a LAN in operation S360, and the first terminal 301 may provide the selected service to the second terminal 302 in operation S370.

Operations S360 and S370, shown in FIG. 5, correspond to operations S440 shown in FIG. 6 and operation S540 shown in FIG. 7.

FIGS. 8A through 8C and 9 are diagrams illustrating an example of displaying a service list on the mobile terminals 100 and 200 according to various embodiments of the present disclosure.

Figure 8A:
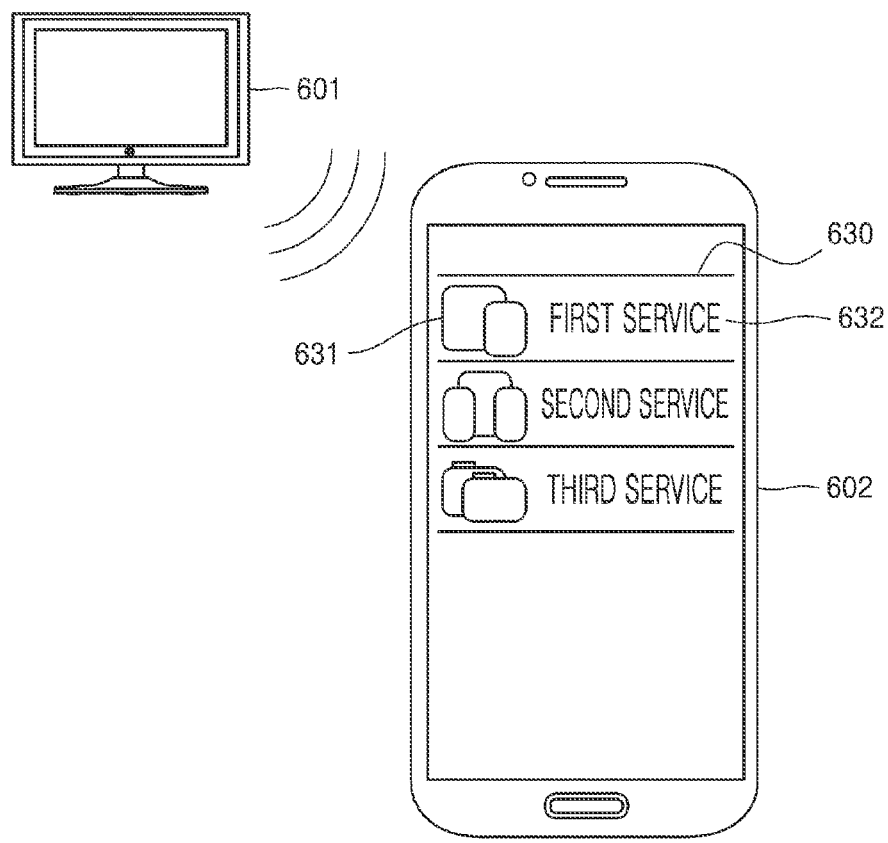
FIGS. 8A, 8B, 8C, and FIG. 9 are diagrams illustrating an example of displaying a service list on a mobile terminal according to various embodiments of the present disclosure.

Referring to FIG. 8A, an external terminal 601, for example, a TV, may include an AP function. While the external terminal 601 is operating a LAN interface, if a mobile terminal 601 is near the external terminal 601 and operates the identical LAN interface, the mobile terminal 602 may recognize the external terminal 601 and display the external terminal 601 and a service list 630 that may be provided by the external terminal 601.

Figure 8B:
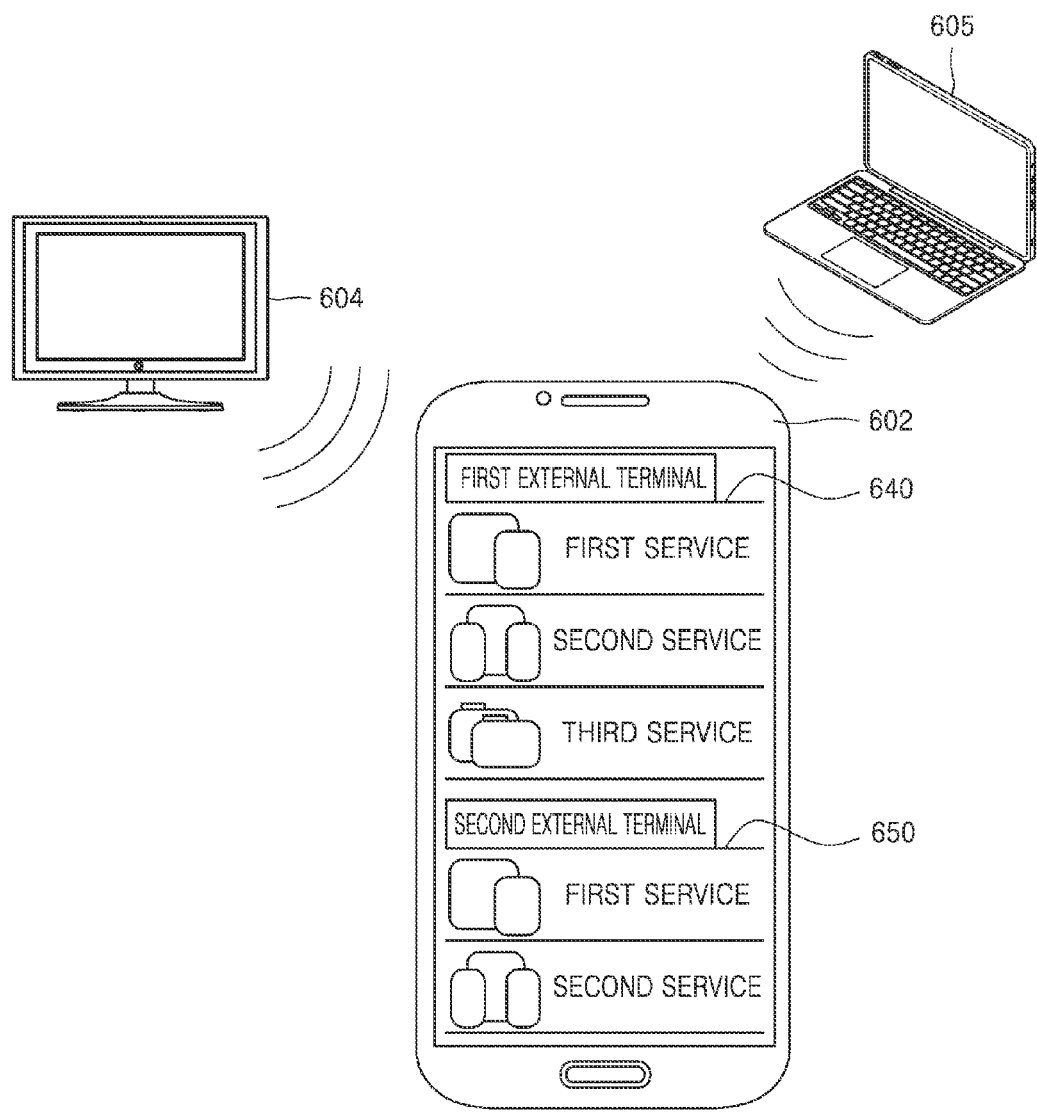

Referring to FIG. 8B, if a plurality of external terminals are present, while the plurality of external terminals 604 and 605 are operating a LAN interface, if a mobile terminal 602 is near the external terminals 604 and 605 and operates the identical LAN interface, the mobile terminal 602 may recognize the external terminals 604 and 605 and display service lists 640 and 650 for each external terminal.

Figure 8C:
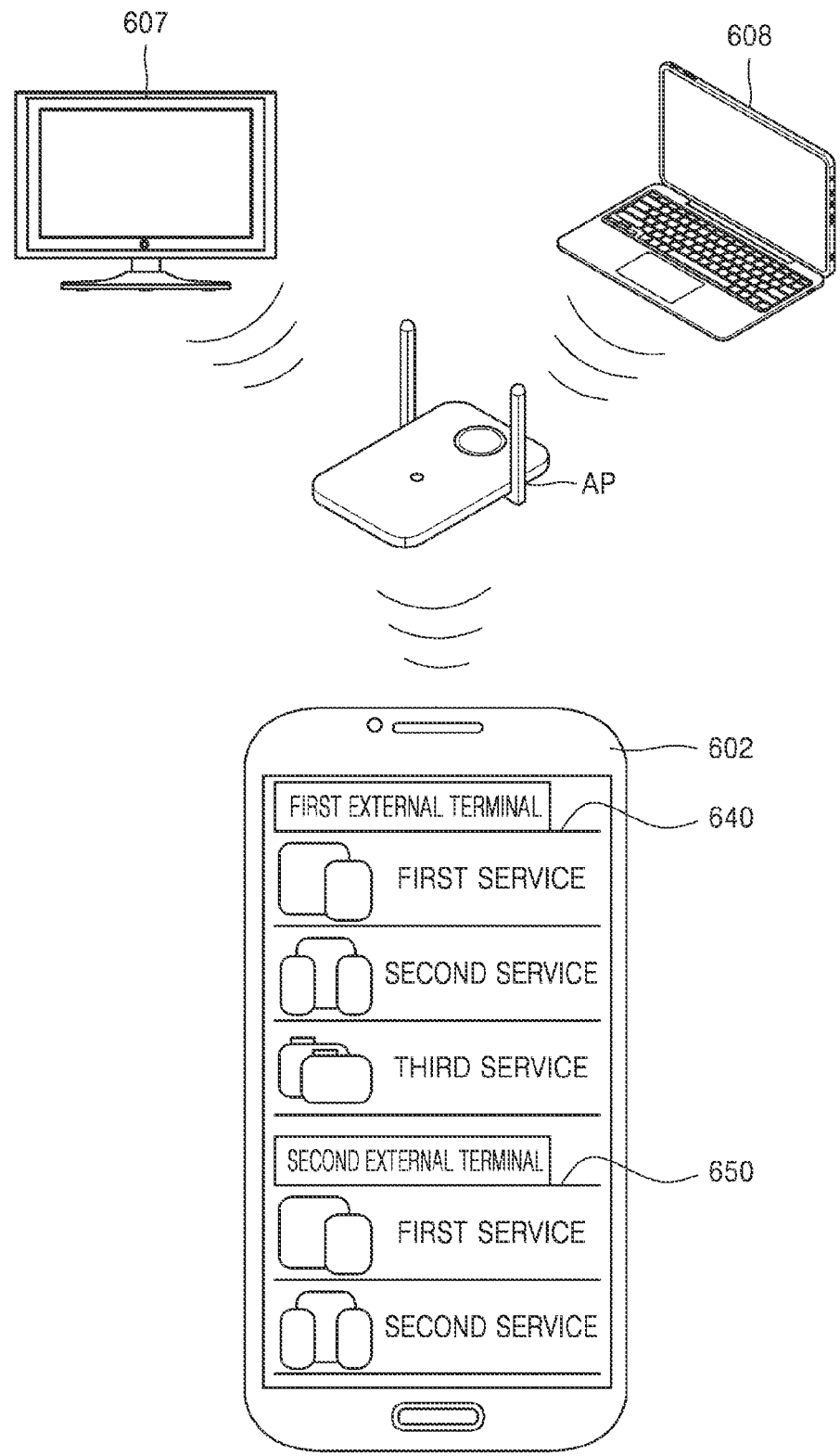

On the contrary, referring to FIG. 8C, if external terminals 607 and 608 do not include an AP function, the external terminals 607 and 608 are connected to a separate AP, and the mobile terminal 602 may display a service list of the external terminals 607 and 608 according to a wireless frame signal broadcast by the AP. As shown in FIGS. 8A through 8C, a service list 630, 640, or 650 may include an icon 631 for representing a service and a service name 632 describing the service. The service list 630 may display an icon for representing whether a service may be connected to the mobile terminal 602 and an icon representing a service that may be connected to the mobile terminal 602 together, or may display only a service that may be connected to the mobile terminal 602.

When a service list is displayed, an icon representing a service, which is set as a service frequently used by a user, may be displayed separately in the service list.

If one external terminal provides many services, a service list may be displayed to include a selected number of the services in accordance with a preset criterion.

As described above, according to an embodiment of the present disclosure, a mobile terminal may display an external terminal and a service list that may be provided by the external terminal, by operating a network interface, thereby providing a user convenience. Thus, a user may easily check a service list of an external terminal, without having to additionally connect the mobile terminal to a LAN.

Figure 9:
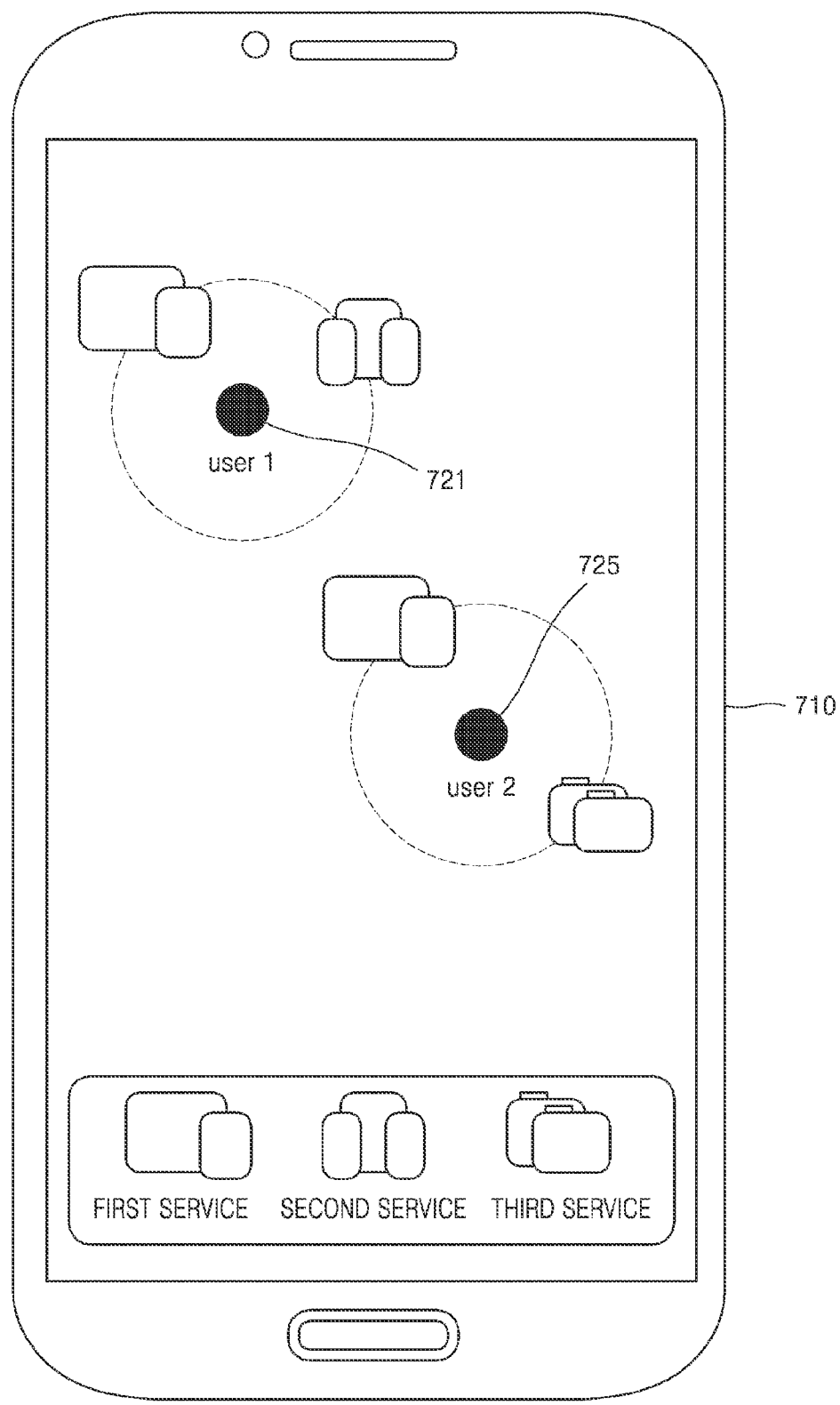

Additionally, as shown in FIG. 9, a relevant location of an external terminal that provides a service may be displayed in a service list, and a location of a mobile terminal and a service that may be provided by the mobile terminal may be displayed together.

For example, a user 1 shown in FIG. 9 may represent a mobile terminal 710, and a user 2 may represent an external terminal. Points 721 and 725 at which the user 1 and the user 2 are displayed may respectively represent relative locations of the mobile terminal 710 and the external terminal. Relative locations of the user 1 and the user 2 may be determined, for example, based on a Received Signal Strength Indicator (RSSI) of each terminal.

A list of services available may be displayed on a display unit, and a service list that may be provided by a mobile terminal and a service list that may be provided by an external terminal may be displayed on the first point 721 at which the user 1 is displayed and on the second point 725 at which the user 2 is displayed, together.

Accordingly, a user may easily check the list of the services that may be provided by the external terminal, which is recognized via a LAN interface, and a location of the external terminal.

Thus, a user may select one of a plurality of the services that are included in the displayed service list, connect the mobile terminal to an external terminal that corresponds to the selected service via the LAN network, and receive the service.

With regard to a mobile terminal and a method of operating the same in various embodiments of the present disclosure, configurations and methods, described above, are not intended to limit various embodiments of the present disclosure. All or part of each embodiment may be selectively combined so that various changes and modifications may be made.

As described above, according to the one or more of the above various embodiments of the present disclosure, a service list may be received without having to connect a mobile terminal to a LAN network, and thus, a user may avoid an unnecessary connection operation.

Additionally, since a connection time for using a service provided by an external terminal may be reduced, user convenience may be enhanced.

In addition, other various embodiments of the present disclosure can also be implemented through computer readable code/instructions in/on a non-transitory medium, e.g., a computer readable medium, to control at least one processing element to implement any above described embodiment. The medium can correspond to any medium/media permitting the storage, regardless of duration, of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., Compact Disc ROMs (CD-ROMs), or Digital Versatile Discs (DVDs)), and transmission media such as Internet transmission media. Thus, the medium may be such a defined and measurable structure including or carrying a signal or information, such as a device carrying a bitstream according to one or more various embodiments of the present disclosure. The media may also be a distributed network, so that the computer readable code is stored/transferred and executed in a distributed fashion. Furthermore, the processing element could include a processor or a computer processor, and processing elements may be distributed and/or included in a single device.

It should be understood that the various embodiments described therein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a mobile terminal, the method comprising:
    receiving, an external terminal without connecting to the external terminal via a local area network (LAN), a list broadcast on the LAN by the external terminal, the list comprising at least one service that the external terminal performs for and provides to the mobile terminal via the LAN;
    displaying the received list;
    requesting, based on the displayed list, the external terminal to provide the service;
    connecting to the external terminal via the LAN; and
    receiving the requested service via the LAN.

2. The method of claim 1, wherein the displaying of the received list comprises displaying a service list which comprises an identification (ID) of the external terminal and a name of the service.

3. The method of claim 2, wherein the displaying of the received list comprises displaying a first icon indicating whether the service may be provided to the mobile terminal and a second icon identifying the service that may be provided to the mobile terminal.

4. The method of claim 1, wherein the displaying of the received list comprises displaying a relative location of the external terminal.

5. The method of claim 4, wherein the relative location is determined according to a received signal strength indicator (RSSI).

6. The method of claim 1, wherein the request to provide the service comprises:
    receiving an input selecting at least one service displayed in the list; and
    transmitting a signal for the request to the external terminal.

7. The method of claim 1, wherein the requesting to provide the service included in the list comprises transmitting to the external terminal a first signal requesting the service, and a second signal requesting connection via the LAN to the external terminal.

8. The method of claim 1, wherein the LAN comprises at least one from among BLUETOOTH (BT), BLUETOOTH low energy (BLE), or Wi-Fi.

9. The method of claim 1, wherein the mobile terminal and the external terminal communicate the list on an identical LAN interface.

10. A non-transitory computer-readable storage medium having stored thereon a computer program, which when executed by a computer, performs the method of claim 1.

11. A mobile terminal comprising:
    a wireless transceiver configured to receive, from an external terminal without connecting to the external terminal via a local area network (LAN), a list broadcast on the LAN by the external terminal, the list comprising at least one service that the external terminal performs for and provides to the mobile terminal via the LAN; and
    a display configured to display the received list,
    wherein the wireless transceiver is further configured to:
        transmit a signal to the external terminal requesting, based on the displayed list, the external terminal to provide the service,
        connect the mobile terminal to the external terminal that corresponds to the requested service via the LAN, and
        receive the requested service via the LAN.

12. The mobile terminal of claim 11, further comprising a service list processor configured to:
    control to receive the list, and
    configure the displayed list.

13. The mobile terminal of claim 11, wherein the display is further configured to display a service list, which comprises an identification (ID) of the external terminal that provides the service and a name of the service.

14. The mobile terminal of claim 13, wherein the displaying of the list comprises displaying a first icon indicating whether the service may be provided to the mobile terminal and a second icon identifying the service that may be provided to the mobile terminal.

15. The mobile terminal of claim 11, wherein the display is further configured to display a relative location of the external terminal.

16. The mobile terminal of claim 15, wherein the relative location is determined according to a received signal strength indicator (RSSI).

17. The mobile terminal of claim 11, further comprising a user input device configured to receive an input of selecting the at least one service in the displayed list,
wherein the wireless transceiver is further configured to transmit a signal for the request to the external terminal that corresponds to the selected service.

18. The mobile terminal of claim 11, wherein the wireless transceiver is further configured to transmit to the external terminal a first signal requesting the service, and a second signal requesting connection via the LAN to the external terminal.

19. The mobile terminal of claim 11, wherein the LAN comprises at least one from among BLUETOOTH (BT), BLUETOOTH low energy (BLE), or Wi-Fi.

20. The mobile terminal of claim 11, wherein the mobile terminal and the external terminal communicate the list on an identical LAN interface.

\* \* \* \* \*